April 28, 1964  L. M. J. BALFOUR  3,130,995
PIVOTAL JOINTS
Filed May 25, 1962
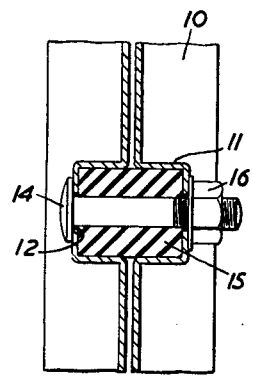
INVENTOR
LIONEL M. J. BALFOUR
BY
Watson, Cole, Grindle & Watson
ATTORNEYS

# United States Patent Office 3,130,995
Patented Apr. 28, 1964

3,130,995
PIVOTAL JOINTS
Lionel Maxwell Joachim Balfour, The Folly,
Chavenage Lane, Tetbury, England
Filed May 25, 1962, Ser. No. 197,784
4 Claims. (Cl. 287—101)

This invention relates to pivotal joints for articles which are to be pivoted to one another and which are made of thin material such as sheet metal. If a hole is made through each of the thin members and they are connected together by a pin, bolt or the like which acts as a pivot (hereinafter referred to simply as a pin), the area of the bearing surface of each member upon the pin is very small, being of an axial width equal only to the thickness of the material and a diameter equal to that of the hole. Such a joint is relatively flimsy, and wear may be rapid.

According to the present invention, a pivotal joint for two members made of thin material comprises opposed depressions of circular cross-section formed in the two members coaxially with the pivotal axis, the base of each depression having a central hole and a bush which occupies the chamber formed by the depressions, and from the ends of which spigots project through the holes. The spigots may conveniently be afforded by opposite ends of a pin, such as a bolt or rivet, passing through a bore in the bush.

In this manner, the bearing area is substantially increased, since it must comprise at least the internal surface area of the walls of one of the depressions.

In one form of the invention, the depressions and the bush are cylindrical, the length of the bush being at least as great as the sum of the depths of the depressions.

If the bush is made slightly longer than the sum of the depth of the depressions, a corresponding clearance is maintained between the two members, so they will not rub against each other during the pivotal movement.

A specific embodiment will now be described by way of example with reference to the accompanying drawing which is an axial section through a pivotal joint between two similar sheet metal members.

Each sheet metal member 10 which may be of channel section is formed with a pressed-out cylindrical depression 11 having a hole 12 in the centre of its base to enable a pin 14 to pass through. A bush 15 is provided which fits on the pin in the recess formed by the depressions, the outer diameter of the bush being such that it is a running fit in the depressions and the axial length of the bush being slightly greater than the sum of the depths of the depressions. The members 10 are assembled with the two depressions in line and facing one another, the bush is inserted in the recess formed by the two depressions, and the pin is then inserted through the holes in the members and the bush and is then secured, for example by riveting or screwing on a nut 16. When the members are pivoted about the axis of the pin, one or both of the depressions will turn relatively to the bush, the area over which relative sliding movement takes place being equal to the internal wall area of one of the depressions if only one member turns relatively to the bush, or to the internal wall area of both depressions if there is relative motion between both members and the bush.

Such pivotal joints have a variety of uses; one particular application is to the pivotal joints of "lazy tongs" linkages where the links are sheet metal pressings.

What I claim as my invention and desire to secure by Letters Patent is:

1. A pivotal joint for allowing relative rotary movement between two members made of thin material, the members being formed to provide opposed depressions of circular cross sections with a hole formed in the base of each depression, a bush fitting in the chamber formed by the two depressions and forming a bearing connecting the members so as to permit relative rotation between them about the axis of the bush while preventing relative movement at right angles thereto, and means extending through the said holes for holding the joint assembled.

2. A joint as claimed in claim 1 in which the means for holding the joint assembled includes a pin extending through a bore in the bushand through the holes in the bases of the depressions.

3. A joint as claimed in claim 1 in which the depressions and the bush are cylindrical the length of the bush being at least as great as the sum of the depths of the depressions.

4. A joint as claimed in claim 3 in which the length of the bush is slightly greater than the sum of the depths of the depressions so as to maintain a clearance between the two members.

References Cited in the file of this patent
UNITED STATES PATENTS

| | | |
|---|---|---|
| 398,994 | Andersen | Mar. 5, 1889 |
| 1,339,574 | Pfau | May 11, 1920 |
| 2,369,421 | Warren | Feb. 13, 1945 |